United States Patent [19]

Wright et al.

[11] 4,030,003

[45] June 14, 1977

[54] MINIATURE TRIMMER WITH FLEXIBLE PLASTIC BASE

[76] Inventors: Harold E. Wright, 162 Putnam Drive, Erie, Pa. 16511; Lee A. Donatelli, 14 Summit St., Erie, Pa. 16508

[22] Filed: Aug. 22, 1975

[21] Appl. No.: 607,031

[52] U.S. Cl. .............................. 361/293; 361/278
[51] Int. Cl.² .......................................... H01G 5/06
[58] Field of Search ................ 317/249 R, 249 D; 174/110 FC

[56] References Cited

UNITED STATES PATENTS

| | | | |
|---|---|---|---|
| 2,693,557 | 11/1954 | Kodama | 317/249 D |
| 3,202,889 | 8/1965 | Matsui | 317/249 D |
| 3,244,951 | 4/1966 | Wallace | 317/249 D |
| 3,258,665 | 6/1966 | Sperry | 317/249 D |
| 3,681,664 | 8/1972 | Metzger | 317/249 DD |
| 3,705,335 | 12/1972 | Metzger | 317/249 |

FOREIGN PATENTS OR APPLICATIONS

| | | | |
|---|---|---|---|
| 224,109 | 9/1959 | Australia | 317/249 D |
| 2,011,884 | 9/1971 | Germany | 317/249 D |
| 974,252 | 11/1964 | United Kingdom | 317/249 D |
| 543,225 | 2/1942 | United Kingdom | 317/249 D |
| 726,958 | 10/1952 | United Kingdom | 317/249 D |

OTHER PUBLICATIONS

The Journal of Teflon 5 & 6, 1970, Dupont, Wilmington, Del., pp. 6 & 7.

*Primary Examiner*—E. A. Goldberg
*Attorney, Agent, or Firm*—Ralph Hammar

[57] ABSTRACT

A trimmer capacitor for electronic watches and other electric circuits requiring compact, low profile trimmers. The capacitor has a rigid ceramic rotor with a flat lower surface and stator of a metal clad flexible sheet of dielectric material having the metal cladding presented to and making conforming contact with the lower surface of the rotor.

3 Claims, 9 Drawing Figures

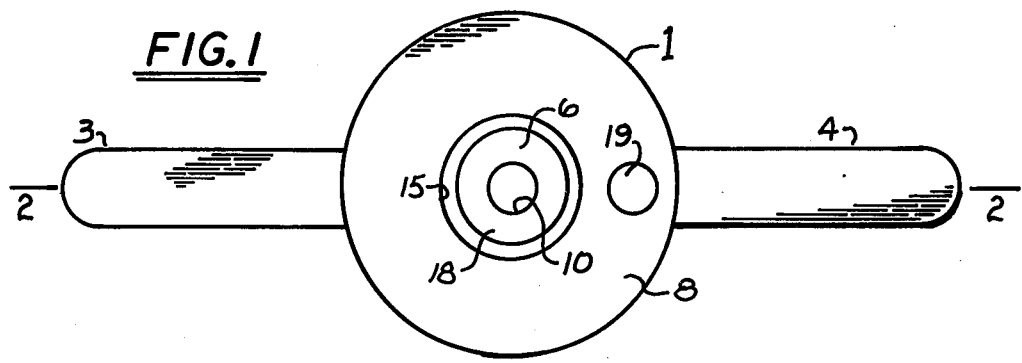
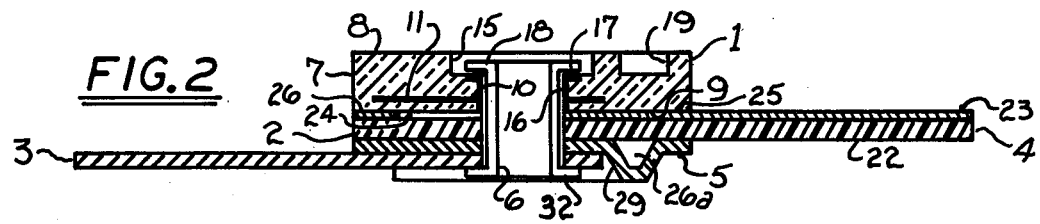
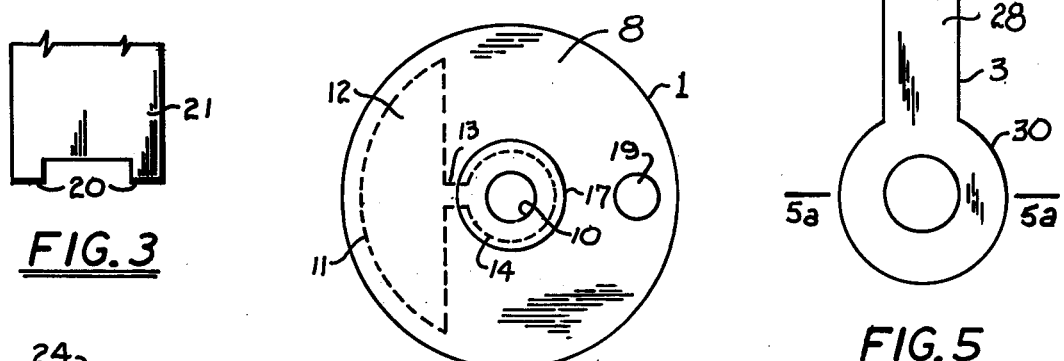
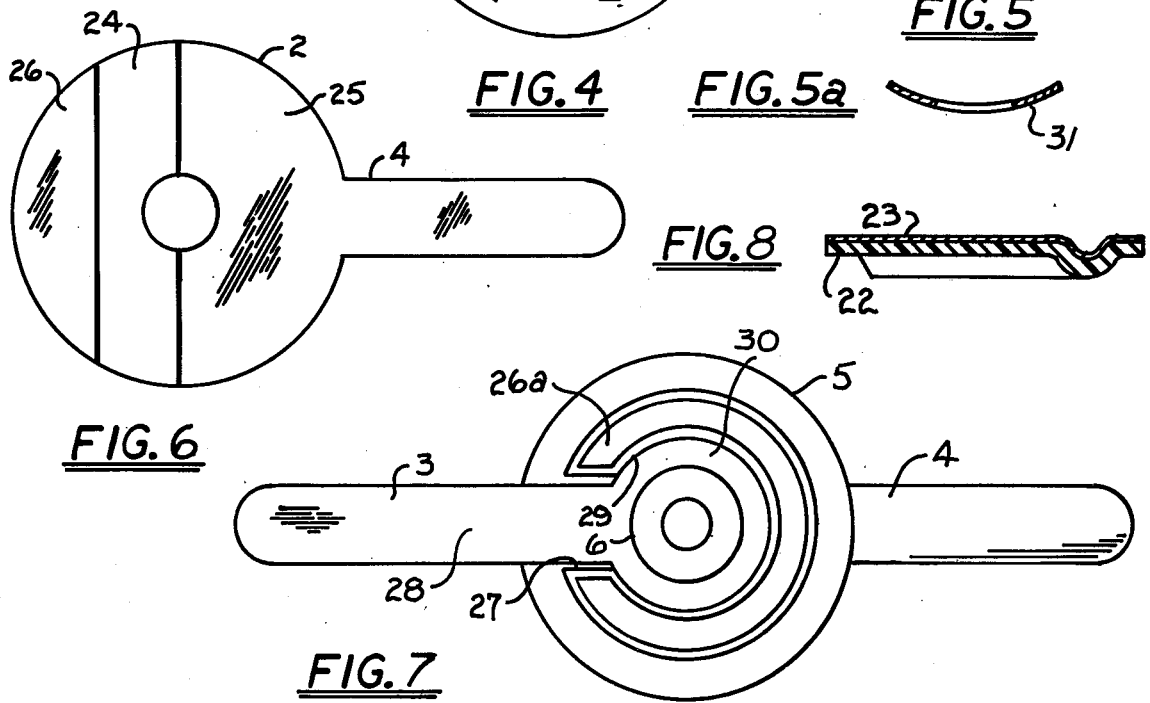

MINIATURE TRIMMER WITH FLEXIBLE PLASTIC BASE

This invention is intended to decrease the space requirements and improve the stability of trimmer capacitors.

In the drawing

FIG. 1 is a top plan view of a preferred embodiment of the trimmer capacitor,

FIG. 2 is a section on line 2—2 of FIG. 1,

FIG. 3 is a fragmentary elevation of a spanner for adjusting the trimmer,

FIG. 4 is a top plan view of the rotor,

FIG. 5 is a plan view of the rotor terminal,

FIG. 5a is a section on line 5a, 5a of FIG. 5, and

FIG. 6 is a plan view of the stator,

FIG. 7 is a bottom view of the trimmer, and

FIG. 8 is a section through a modification of the thrust washer.

Referring to the drawing, the trimmer has a rotor 1, a stator 2, a rotor terminal 3, a stator terminal 4, a pressure washer 5 and a hollow rivet 6 for holding the parts in assembled relation.

The rotor is a monolithic ceramic disc 7 with upper and lower surfaces 8,9 and a center hole 10 normal to said surfaces. The disc is thick enough to be rigid and is conveniently made by stacking several layers of green ceramic, each too thin to be separately fired, and pressing and firing the stack into a sintered monolith. One of the layers in the stack is provided with an electrode pattern indicated in FIG. 4 by dotted lines 11 which when fired is close to the lower surface 9 of the monolith. The electrode has a segmental section 12 and an extension 13 leading to a section 14 extending to the bore of the center hole. In the top surface 8 of the rotor is a recess 15 concentric with the center hole. A metallic coating 16 in the bore of the hole 10 makes edge contact with the sections 13,14 of the rotor electrode. A continuation 17 of the metal coating 16 on the bottom wall of the recess 15 transfers the electrical contact from the rotor electrode to the top flange 18 of the hollow rivet 6. In the top surface 8 of the rotor there is also a recess 19 radially spaced from the center hole. The center hole 10 and the recess 19 receive projections 20 of a spanner 21 which applies the adjusting torque to the rotor.

The undersurface 9 of the rotor is ground flat for two purposes: first, to reduce the thickness of the active section of the dielectric between the electrode 11 and the surface 9 and second, to provide a flat planar surface eliminating any distortions produced during the firing of the ceramic.

The stator 2 is made of a flexible metal clad dielectric of the type used for printed circuit boards. The dielectric 22 is preferably one of the high quality dielectrics such as Teflon reinforced with glass fiber. The metal coating 23 may be silver plated copper. The board is commercially available in standard size sheets and with many metal-dielectric combinations. The upper surface of the metal cladding 23 is sufficiently flat and smooth so that no grinding or lapping is required.

The first step in manufacture of the stator is to remove the metal cladding in the space 24 between an electrode area 25 and an area 26 which has no electrical function but which serves as a balance pad preventing tilting of the rotor and to punch out the shape shown in FIG. 6. In FIG. 2 the rotor electrode 11 and the stator electrode 25 are shown in the minimum capacitance position. Maximum capacitance would be obtained when the rotor was rotated relative to the stator 180° from the position shown. The stator terminal 4 is integral with the electrode area 25.

The stator is held against the undersurface 9 of the rotor by a pressure washer 5. The pressure washer has a hollow arcuate rib 26a on its underside which increases the rigidity of the washer so it will maintain the electrode 25 and balance pad 26 of the stator tightly against the undersurface 9 of the rotor. The rib 26a has an interruption 27 (FIG. 7) for receiving and locating the shank 28 of the rotor terminal 3 and has an innersurface 29 receiving and locating the head 30 of the rotor lead. The rotor terminal is a sheetmetal stamping which is slightly dished as indicated at 31 in FIG. 5a to introduce a spring action into the compression forces holding the stator and rotor together.

For applications requiring insulation, a pressure washer 5 may be made of the same printed circuit board laminate 22,23 used in the manufacture of the stator. FIG. 8 is a section through such a washer. The metal cladding 23 imparts rigidity to the pressure washer. The insulation 22 on the exposed surface of the washer eliminates direct contact between the rotor lead and the pressure washer.

In the manufacture the rotor 1, stator 2, and rotor terminal 3 are assembled on the hollow rivet 6 and the lower end of the rivet is spun over to provide a flange 32 holding the parts together and making contact to the rotor terminal 3. The flexibility of the stator provides conforming contact with the undersurface 9 of the rotor which reduces the temperature coefficient (TC) of the trimmer.

What is claimed:

1. A trimmer capacitor comprising a rigid dielectric disc having upper and lower surfaces and a center hole normal to said surfaces, the lower surface being flat, said disc having a rotor electrode above said lower surface and including a metal coating on said upper surface, a metal clad flexible sheet of dielectric material having on one side metal cladding presented to and engaging and making conforming contact with said lower surface, said sheet having a section registering with said disc and an integral terminal extending from said section, said metal cladding being removed to provide a stator electrode integral with said terminal on the one side of said hole and a balance pad on the opposite side of said hole, a compression washer engaging the unclad side opposite said one side and exerting a force on said sheet holding the stator electrode and balance pad against said lower surface, a rotor terminal engaging the under side of said washer, and a hollow rivet having a flange making contact on said upper surface around the hole and a flange making contact with and holding said rotor terminal against the under side of said washer.

2. A trimmer capacitor comprising a rigid dielectric disc having upper and lower surfaces and a center hole normal to said surfaces, the lower surface being flat, a rotor electrode embedded in the disc between said surfaces and having an edge extending to said hole, a metal coating on said upper surface and on the bore of said hole making contact with said edge, a metal clad flexible sheet of dielectric material having metal cladding presented to and engaging and making conforming contact with said lower surface, said sheet having a section registering with said disc and an integral terminal extending from said section, said metal cladding being removed to provide a stator electrode integral with said terminal on one side of said hole and a balance pad on the opposite side of said hole, a compression washer engaging the laminate and exerting a force holding the stator electrode and balance pad against said lower surface, a rotor terminal engaging the under side of said washer, said rotor terminal having a head and said compression washer being of sheet metal with a hollow arcuate rib receiving and locating the head, and a hollow rivet having a flange making contact on said upper surface around the hole and a flange being in contact with and holding said rotor terminal against the under side of said washer.

3. A trimmer capacitor comprising a rigid dielectric disc having upper and lower surfaces and a center hole normal to said surfaces, the lower surface being flat, a rotor electrode embedded in the disc between said surfaces and having an edge extending to said hole, a metal coating on said upper surface and on the bore of said hole making contact with said edge, a metal clad flat sheet of dielectric material having metal cladding presented to and engaging said lower surface, said sheet having a section registering with said disc and an integral terminal extending from said section, said metal cladding being removed to provide a stator electrode integral with said terminal on the one side of said hole and a balance pad on the opposite side of said hole, a compression washer engaging the laminate and exerting a force holding the stator electrode and balance pad against said lower surface, said washer being of metal clad dielectric with the dielectric exposed on the under side of the washer, a rotor terminal engaging the exposed dielectric on the under side of said washer, and a hollow rivet having a flange making contact on said upper surface around the hole and a flange making contact with and holding said rotor terminal against the under side of said washer.

* * * * *